US011270505B2

(12) United States Patent
Ponjou Tasse et al.

(10) Patent No.: US 11,270,505 B2
(45) Date of Patent: Mar. 8, 2022

(54) CAPTURE OF RAW AUGMENTED REALITY DATA AND SUBSEQUENT 3D MESH GENERATION

(71) Applicant: STREEM, INC., Portland, OR (US)

(72) Inventors: Flora Ponjou Tasse, London (GB); Pavan Kumar Kamaraju, London (GB); Ghislain Fouodji Tasse, London (GB); Ryan R. Fink, Vancouver, WA (US); Sean M. Adkinson, North Plains, OR (US)

(73) Assignee: STREEM, INC, Portland, OR (US)

( * ) Notice: Subject to any disclaimer, the term of this patent is extended or adjusted under 35 U.S.C. 154(b) by 0 days.

(21) Appl. No.: 16/881,835

(22) Filed: May 22, 2020

(65) Prior Publication Data

US 2020/0372709 A1    Nov. 26, 2020

Related U.S. Application Data

(60) Provisional application No. 62/851,470, filed on May 22, 2019.

(51) Int. Cl.
| | |
|---|---|
| *G06T 17/20* | (2006.01) |
| *G06T 7/55* | (2017.01) |
| *G06T 19/00* | (2011.01) |
| *G06T 7/70* | (2017.01) |
| *H04N 5/06* | (2006.01) |
| *G06N 3/02* | (2006.01) |

(52) U.S. Cl.
CPC ............... *G06T 17/20* (2013.01); *G06T 7/55* (2017.01); *G06T 7/70* (2017.01); *G06T 19/006* (2013.01); *H04N 5/06* (2013.01); *G06N 3/02* (2013.01); *G06T 2207/10016* (2013.01); *G06T 2207/10028* (2013.01); *G06T 2207/20084* (2013.01)

(58) Field of Classification Search
CPC ............... G06F 2111/18; G06F 3/0481; G06F 3/04817; G06F 9/4443; G06F 3/04847; G06F 11/3664; G06F 3/0304; G06F 3/011–015; G06K 9/00664–00704; G06T 19/00; G06T 17/00; G06T 7/00; G06T 19/006; G06T 2215/16; G06T 17/20; G06T 15/10; G06T 15/00; G06T 17/205; G06T 15/04; G06T 11/40; G06T 15/005; H04N 5/272; H04N 2201/3245; A63F 13/10

See application file for complete search history.

(56) References Cited

U.S. PATENT DOCUMENTS

2013/0286004 A1* 10/2013 McCulloch ........... G06T 19/006
                                                            345/419
2014/0059630 A1*  2/2014 Kim ................... H04N 21/2389
                                                            725/109

(Continued)

*Primary Examiner* — Todd Buttram
(74) *Attorney, Agent, or Firm* — Schwabe Williamson & Wyatt

(57) ABSTRACT

Embodiments include systems and methods for generating a 3D mesh from a video stream or other image captured contemporaneously with AR data. The AR data is used to create a depth map, which is then fused with images from frames of the video to form a full 3D mesh. The images and depth map can also be used with an object detection algorithm to recognize 3D objects within the 3D mesh. Methods for fingerprinting the video with AR data captured contemporaneously with each frame are disclosed.

19 Claims, 8 Drawing Sheets

(56) References Cited

U.S. PATENT DOCUMENTS

| | | | | |
|---|---|---|---|---|
| 2014/0287806 A1* | 9/2014 | Balachandreswaran | ..................... A63F 13/212 | |
| | | | | 463/7 |
| 2015/0054823 A1* | 2/2015 | Dzhurinskiy | ......... G06T 19/006 | |
| | | | | 345/419 |
| 2016/0307371 A1* | 10/2016 | Ayers | ..................... G11B 27/19 | |
| 2016/0314612 A1* | 10/2016 | Schoenberg | ............ G06T 15/40 | |
| 2020/0111255 A1* | 4/2020 | Brodsky | .............. G02B 27/017 | |
| 2020/0193640 A1* | 6/2020 | Mathy | ..................... G01S 7/497 | |
| 2020/0368616 A1* | 11/2020 | Delamont | ............... A63F 13/25 | |

\* cited by examiner

US 11,270,505 B2

CAPTURE OF RAW AUGMENTED REALITY DATA AND SUBSEQUENT 3D MESH GENERATION

CROSS-REFERENCE TO RELATED APPLICATIONS

This application claims the benefit of U.S. Provisional Application No. 62/851,470, filed on 22 May 2019, the entire contents of which are hereby incorporated by reference herein.

TECHNICAL FIELD

The present disclosure relates to the field of augmented reality (AR), and specifically to capture of raw image and associated AR data, and subsequent processing.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect features in the video, such as planes, surfaces, faces, and other recognizable shapes. These detected features, combined in some implementations with data from depth sensors and/or motion information captured from motion sensors such as a MEMS gyroscope and accelerometers, can facilitate AR software in creating a point cloud in a three-dimensional space. This point cloud enables AR-based applications to generate and place virtual objects within a 3-D space represented by the captured images and/or video. These point clouds may be associated and stored with their source images, video, and/or depth or motion data.

BRIEF DESCRIPTION OF THE DRAWINGS

Embodiments will be readily understood by the following detailed description in conjunction with the accompanying drawings. Embodiments are illustrated byway of example and not byway of limitation in the figures of the accompanying drawings.

DETAILED DESCRIPTION OF DISCLOSED EMBODIMENTS

Figure 1:
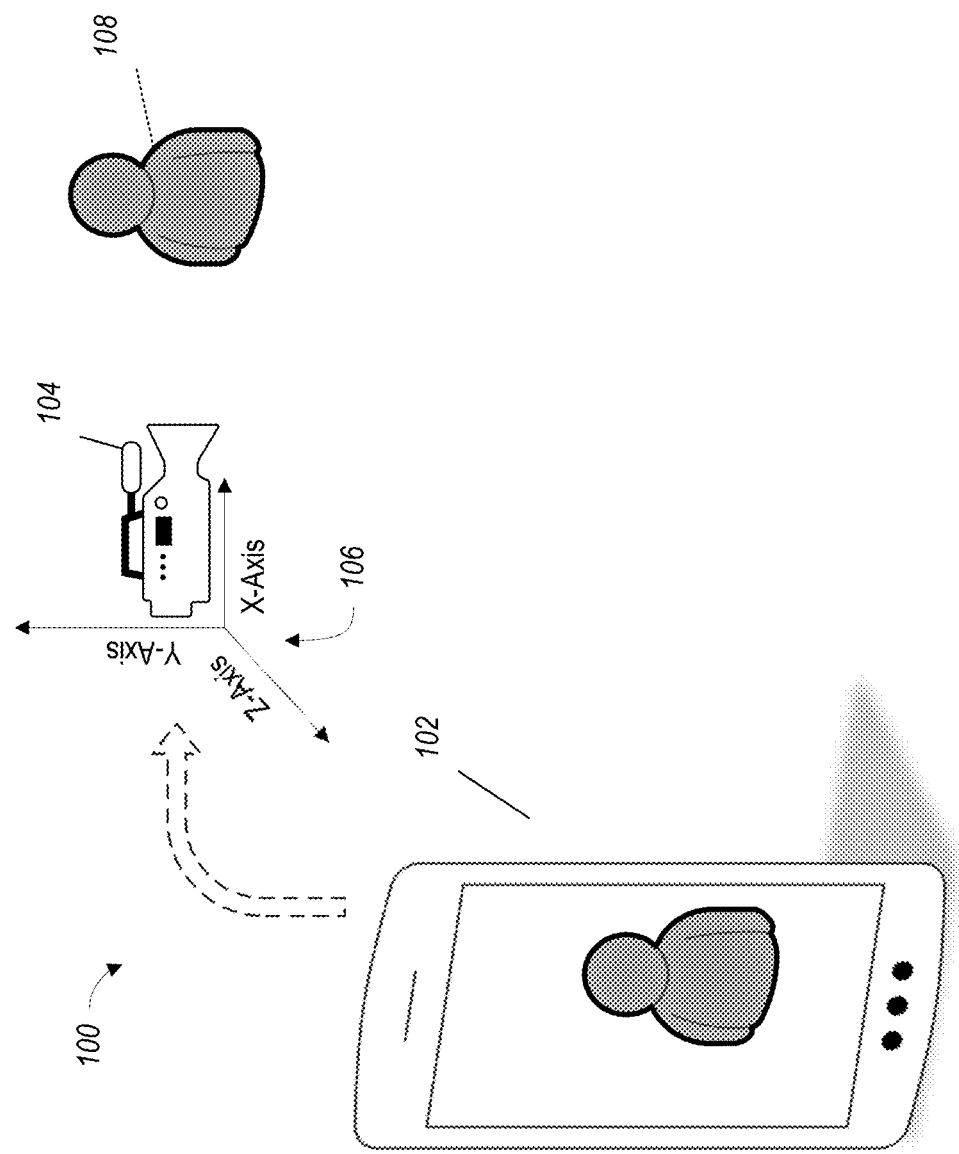
FIG. 1 illustrates a block diagram of the components of a system for capturing an image and corresponding AR data, according to various embodiments.

In the following detailed description, reference is made to the accompanying drawings which form a part hereof, and in which are shown byway of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

A device that supports AR typically provides an AR session on a device-local basis (e.g., not requiring communication with a remote system), such as allowing a user of the device to capture a video using a camera built into the device, and superimpose AR objects upon the video as it is captured. Support for superimposing AR objects is typically provided by the device's operating system, with the operating system providing an AR application programming interface (API). Examples of such APIs include Apple's ARKit, provided by iOS, and Google's ARCore, provided by Android.

The APIs typically use both the stream of frames captured by the device camera as well as other available motion data, such as a gyroscope and/or accelerometers contained within the device, to compute a point cloud. The point cloud typically includes one or more points that are indicated by an x, y position within the video frame along with a depth (or z-axis). The points are often tied to an identified anchor feature within the frame, e.g. a corner or edge of an object in-frame, which can be readily identified and tracked for movement between frames. The associated x, y, and z values allow the point to be identified in space relative to the device. As may be appreciated, these x, y, and z values will continuously change for each detected/calculated point as the camera of the capturing device moves in space relative to the anchor features. In some implementations, each point in the point cloud may include additional data, such as a confidence value indicating the API's estimate of the accuracy of the computed depth value, location of the anchor point, and/or possibly other extrapolated values.

The calculated point cloud allows AR objects to be placed within a scene and appear to be part of the scene, viz. the AR object moves through the camera's view similar to other physical objects within the scene as the camera moves. Further, by employing object detection techniques along with motion data, in some implementations the API can maintain track of points that move out of the camera's field of view. This allows a placed AR object to disappear off-screen as the camera moves past its placed location, and reappear when the camera moves back to the scene location where the AR object was originally placed.

As may be understood from the foregoing description, the point cloud represents location data about the physical world relative to and surrounding the capturing device. The various points in the point cloud are thus (in most implementations) expressed as values relative from the capturing device. When the capturing device moves, e.g. is panned or tilted, in a sense, these values change, e.g. can be recomputed using sensed motion data about the movements of the capturing device, as though the world were moving about the capturing device's position, with the capturing device serving as a fixed reference point. The motion data captured by the capturing device, then, effectively expresses how the world moves about the capturing device. As the capturing device moves, an increasing amount of the world becomes visible to the capturing device. When combined with continued tracking/storage of detected points that move outside the camera's field of view, the point cloud representing the world detected and viewed through the capturing device's camera that is initially generated can be progressively increased and expanded.

By combining this stored and expanded point cloud with captured images and/or video and any AR information, useful structures, such as a 3D mesh and/or 3D scene graph, representing the world detected by the capturing device can be generated. By combining point cloud data with images from the video, the 3D mesh can be subsequently rendered as a model of the detected world. Further, by correlation of each frame in the video with its captured AR data, the image information from each frame can be mapped upon the 3D mesh, to effectively create a relatively photo-accurate 3D model of the world captured by the capturing device. This 3D model, in embodiments, can be manipulated in a 3D environment and viewed from perspectives different from the original capturing device. In some embodiments, the 3D model can be progressively generated and expanded on the fly as the capturing device continues to move about its environment, viewing previously uncaptured portions of the environment. When the capturing device moves back to previously viewed portions of the environment, the 3D model can be augmented and/or refined, particularly where the capturing device is viewing the previously viewed portions at a different perspective, even if only slightly different from the initial perspective.

FIG. 1 illustrates an example system 100 that may enable capture of an image or video that includes AR data. System 100 may include a consumer device 102. In the depicted embodiment of FIG. 1, consumer device 102 is a smartphone, which may be implemented as a computer device 500, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Consumer device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may include one or more three-dimensional objects 108.

Camera 104 may be any camera that can provide a suitable video stream for the intended purpose of consumer device 102. Where consumer device 102 is implemented as a smartphone or tablet, camera 104 may be one or more built-in cameras. In other embodiments, such as where consumer device is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and consumer device 102. In other embodiments, such as where consumer device 102 is equipped with multiple cameras or similar sensors, one or more of the sensors may be configured to directly detect depth points, such as a 3D camera, LIDAR, or other suitable depth-sensing technology.

Spatial position sensor 106 may be configured to provide positional information about camera 104, such as camera 104's pan and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

Figure 2:
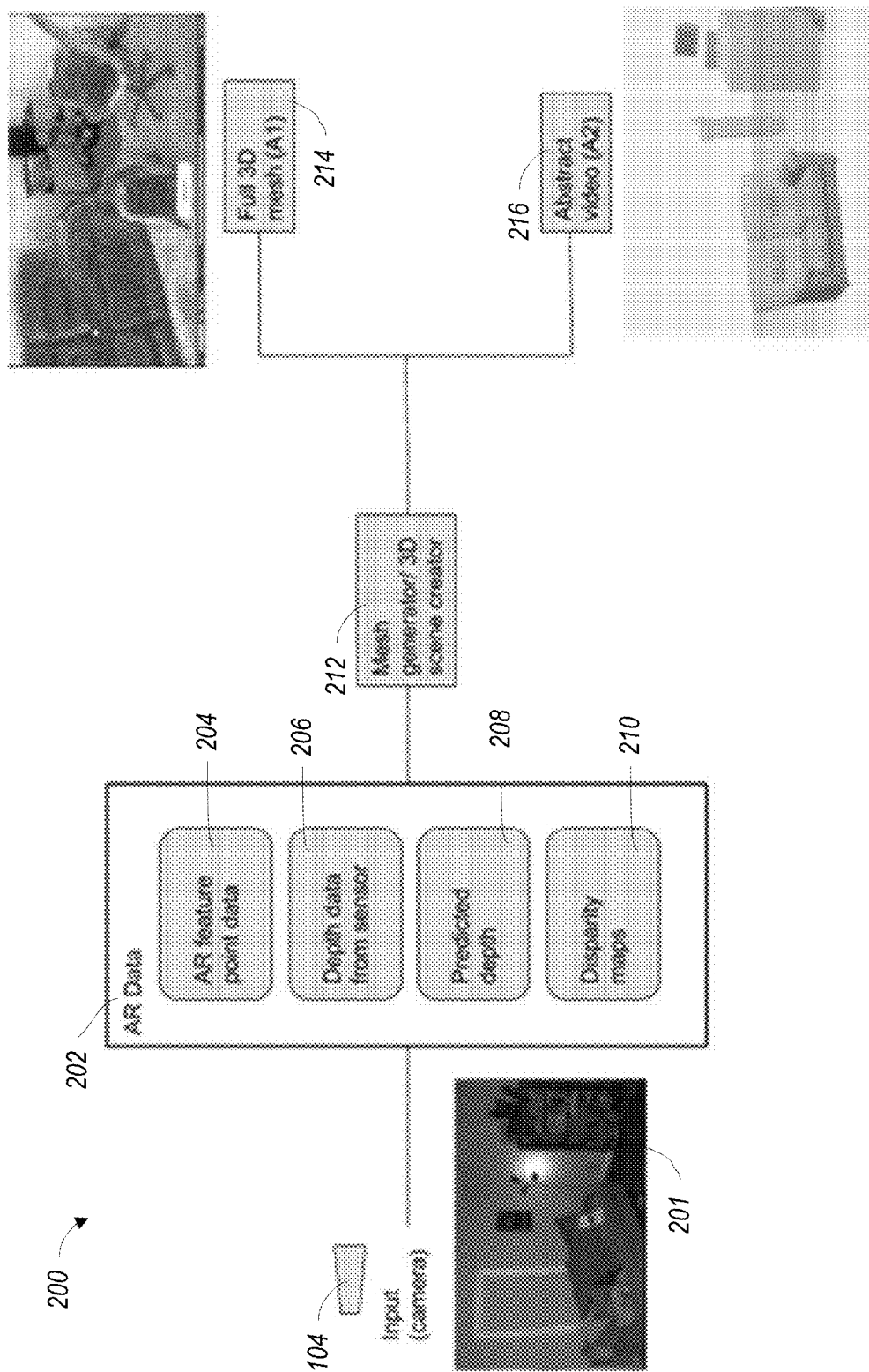
FIG. 2 depicts an example high-level process flow for generating a full 3D mesh from a captured video and associated AR data, according to various embodiments.

FIG. 2 depicts an example process flow 200, according to embodiments, for the capture of a video and associated AR data, and subsequent processing of the video and data into a 3D mesh and abstract video. Initially, a video 201 is captured by an input device, such as a camera 104, along with associated motion data (not depicted). This video 201 is then, in embodiments, processed by the AR API of the capturing device (e.g. ARKit, ARCore) to generate AR data 202, which may be tagged to the video 201. Note that, as used herein, AR data 202 is not data about AR objects, rather, AR data 202 is the data that corresponds to video 201 that may be necessary to enable the placement of AR objects within the captured scene. This AR data 202 may then be used to generate a mesh and/or 3D scene by a mesh generator/scene creator 212. Finally, the mesh and/or 3D scene can be used to generate a full 3D mesh 214, which includes frames from the video 201 (and/or other sources of relevant images) mapped upon the 3D mesh 214 to generate a relatively realistic model. Alternatively or additionally, an abstract video 216, which may present an untextured representation of the scene captured by the camera 104, may be generated from the detected points in the point cloud. The model can then be used in an interactive fashion.

In the depicted embodiment of FIG. 2, AR data 202 may be captured contemporaneously with and/or extracted from, video 201, and may be tagged to video 201, potentially on a frame-by-frame basis (discussed in greater detail below). AR data 202 may include AR feature point data 204, depth data from the sensor 206, predicted depth data 208, and/or disparity maps 210. Other embodiments may include additional data types, different data types, or fewer data types. The various types of AR data 202 may be derived from various raw data inputs, including RGB images (such as the sequence of frames of video 201), camera intrinsics and/or camera transforms (such as from camera 104 and/or spatial position sensor 106), 3D feature points, and/or depth images, among other types of possible data. RGB images may be extracted from frames of the video captured by camera 104. In addition to motion data from spatial position sensor 106, camera intrinsics can include various known or readily determined properties of camera 104, such as focal length, aperture, optical center, angle of view, focal point, etc. For example, knowing the focal point of a camera can allow a rough approximation of distance (depth) to a feature when that feature is in focus. Whether a feature is in focus may be determined by techniques such as edge detection or another contrast-based technique. However, it will be appreciated that, in some instances, only a range of depths may be determined, such as where camera 104 is focused relatively far away from the camera position, and/or the camera 104 utilizes a small aperture (relatively high f-stop, such as f/8, f/11, etc.), so as to offer a large depth of field.

Camera transforms can include the various variables necessary to transform between the 3D objects within the field of view of camera 104 and the 2D image plane of the camera 104. Such variables can include information about the spatial location of the capturing device. 3D feature points can include feature points useable by the AR API to create the AR feature point data 204, and may be extracted from video 201, such as various anchor points or features, and/or captured using one or more sensors that are separate from video 201, such as spatial position sensor 106. Depth images can include imaging captured by a depth-sensitive device, such as a LIDAR sensor or infrared range finder, to allow for direct, and potentially more precise, depth measurements of various points within the scene captured by camera 104. Where direct depth measurements are available, data similar to that available for camera 104 may be used (e.g., camera intrinsics and camera transforms) to process the depth measurements and correlate with the images from camera 104.

As mentioned above, AR feature point data 204 can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 106. Depth data from sensor 206 may include the aforementioned direct depth measurements, which may be correlated with identified AR feature point data 204 by the AR API. Corollary to or alternative to depth data from sensor 206 includes predicted depth data 208, which the AR API may derive from any number of techniques, such as machine learning, or photogrammetry and comparison between proximate frames of the captured video. Similar to such comparison are disparity maps 210, which may include a map indicating the field of view differences between left/right frames in the case of a stereo camera, or proximate frames of the captured video. A disparity map 210 may be useful for computing points in the point cloud, including obtaining predicted depth data 208. It should be understood that proximate frames need not be temporally adjacent in video 201, but rather proximate in terms of field of view: two frames need only simply share at least an overlapping portion of a given scene to be considered proximate for purposes of a disparity map 210.

The mesh generator/scene creator 212, in embodiments, receives the AR data 202 and uses it to generate a 3D mesh, which may then be output as a full 3D mesh 214 and/or an abstract video 216. It accomplishes this by executing one or more of the steps of method 300, described below with respect to FIG. 3.

The resulting output from the mesh generator/scene creator 212 can be a full 3D mesh 214, where the RGB image from various frames of video 201 are mapped onto a 3D mesh generated using the AR data. Such a process may be considered a type of texture mapping, where the RGB image of various frames are used as texture maps. Such mapping requires that the AR data 202 be correlated to each frame from the video 201. The process by which the AR data 202 is correlated will be described in greater detail below. Mapping the RGB image from various frames of video 201 effectively stitches the frames together as they are mapped onto the 3D mesh. The full 3D mesh 214 provides a geometric representation of the captured scene. The full 3D mesh 214 can be used for various purposes, such as simulating physical interactions with objects in the environment represented by the full 3D mesh 214, taking measurements of the represented environment, later exploration or walk-through, or another suitable purpose. Also or alternatively, an abstract video 216 can be output.

It should be understood that, while the foregoing description and subsequent discussions assume that video 201 is in color, e.g. comprised of a plurality of frames that each include an RGB image, other image formats may be utilized. For example, the image data of each frame may instead be expressed using different color systems such as YUV, HSL, CMYK, or another method of expressing color, in alternative embodiments. In still other embodiments, the image information may comprise black and white or greyscale information, with no color information. Further still, other embodiments may utilize a combination of color and greyscale/black and white images.

The abstract video 216 may essentially reproduce the original video captured from camera 104, but with frames generated by rendering objects from the 3D mesh. In some embodiments, the original RGB images from each frame may not be texture mapped to the rendered objects, providing additional abstraction. By not mapping the RGB images, the resulting abstracted video 216 depicts the 3D objects captured by the point cloud in an abstract fashion, as a collection of generic objects. Each frame of the original video may be reproduced based on the correlated AR data 202 associated with the original frame.

Figure 3:
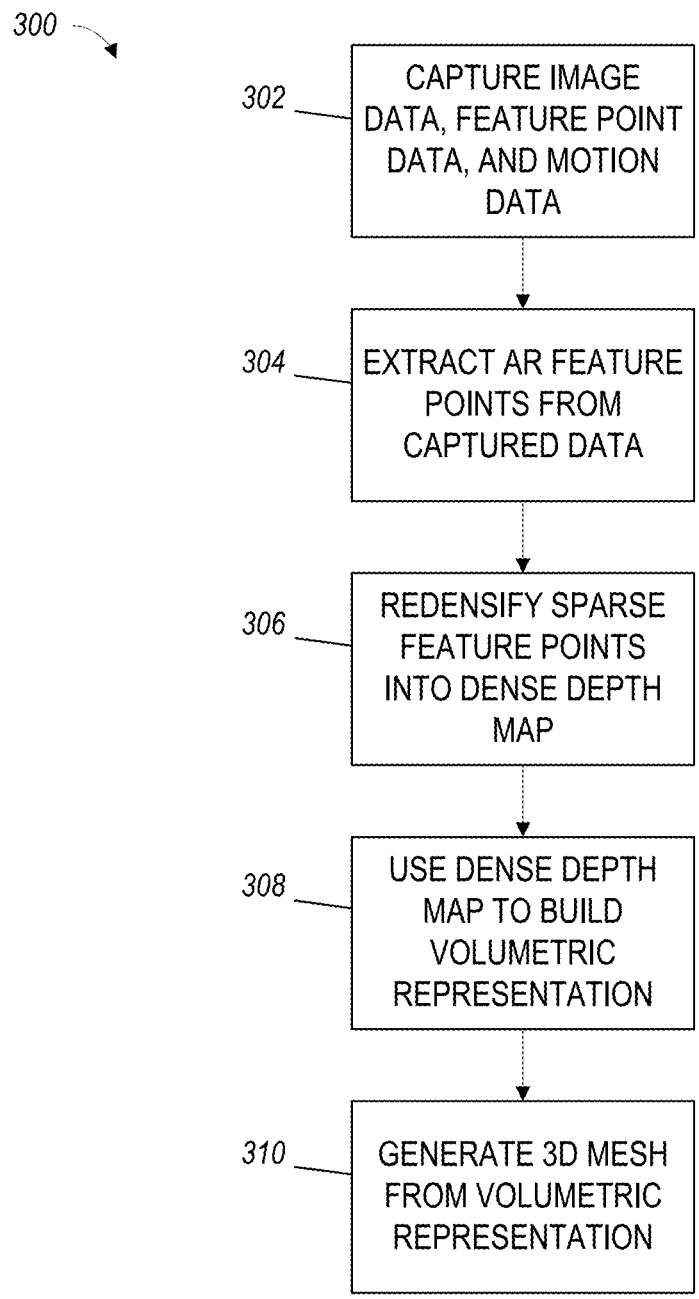
FIG. 3 is a flowchart of the operations of an example method for generating a 3D mesh useable with the example high-level flow of FIG. 2, according to various embodiments.

FIG. 3 depicts an example method 300 for using AR data, such as AR data 202, to generate a 3D mesh. Various embodiments may implement only some or all of the operations of method 300, and each of the operations of method 300 may be performed in whole or in part. Some embodiments may add additional operations. In operation 302, a video may be captured along with associated AR data, as described above with respect to FIGS. 1 and 2. The AR data may be associated with each frame of the video or with a group of frames, and may include data as described above, such as camera intrinsics, camera transforms, 3D feature points, depth images, and/or any other relevant information that may be captured or otherwise made available. The captured video may come from a variety of sources. In some examples, a camera 104 is used to capture the video. In other examples, a different device or devices may be used to capture the video. The AR data may come from, in some examples, other sensors as described above with respect to FIGS. 1 and 2, such as spatial position sensor 106. In embodiments, the video and AR data are captured contemporaneously to ensure appropriate association between the AR data and corresponding video frames. The video and associated AR data may be captured at a previous time, and stored into an appropriate file format that captures the video along with the raw feature points and motion data. Method 300 may then be performed on the stored video and associated data in post-processing.

In operation 304, AR feature points may be extracted from the captured video, also as described with respect to FIGS. 1 and 2. In embodiments, operation 304 may be performed in whole or in part by an ARAPI, as discussed above on a capturing device. The AR feature points may be obtained, such as by the ARAPI, using simultaneous localization and mapping (SLAM), or another suitable technique. In examples where the video is provided as a file from a past capture, the AR feature points may be stored with the video, and correlated to each video frame, similar to the AR data discussed above with respect to operation 302. In some embodiments, the AR feature points may be calculated from a raw video without associated AR data using photogrammetric techniques.

The AR feature points may be relatively sparse with respect to the captured video, such as where the AR feature points are calculated by an ARAPI contemporaneously with the video capture. In operation 306, the video and associated AR data are used to redensify the captured AR feature points into a dense depth map. This may be accomplished using various suitable techniques that incorporate AR data, AR data 202 an example of such AR data. Inputs to densify the AR feature points may include the various color images obtained from the individual frames of the captured video; camera pose, which may include data about the camera position and movements, discussed above, and 3D feature points (such as the AR feature points).

One possible algorithm useful for creating a dense depth map includes, for a given frame of the captured video, first generating a 3D base mesh M that covers the RGB image of the frame, such as by computing a Delaunay Triangulation from the high-gradient pixels in the frame. The 3D base mesh M may include a plurality of vertices. The high-gradient pixels typically indicate a textured area, and the 3D mesh can be propagated to low-gradient (e.g., untextured) areas, discussed below. Next, the AR feature points obtained in operation 304, and/or obtained via simultaneous localization and mapping (SLAM), may be segmented into clusters based upon relative distances from each other, such that AR feature points are clustered with other points that are relatively proximate. Then, a depth value can be assigned to each vertex in the 3D base mesh M, to minimize an energy function E. The energy function takes two main terms: a data term that constrains points interior to the 3D base mesh M to the same depth as the AR feature points, and a smooth term that constrains neighboring areas of the 3D base mesh M to similar values when the pixels corresponding to the neighboring areas of the 3D base mesh M are similar in value. Finally, as mentioned above, the depth values of the base mesh vertices are propagated to the remainder of the image (e.g. the values are assigned to the low-gradient areas), which results in a dense depth map.

Other possible algorithms or techniques may be used for creating the dense depth map. For example, where a capturing device has or is associated with a sensor that can directly measure depth points in a scene, the direct measuring sensor may be capable of providing sufficient directly measured depth points to produce a dense depth map. Another possible method is to use a disparity map, such as disparity maps 210 of AR data 202, to estimate depth data and propagate the data to areas of a similar or low gradient within the disparity map. Such an approach may be considered a form of photogrammetry, relying upon perspective differences between two given frames of approximately the same scene. Still another method may employ a trained neural network (e.g. trained using images and associated dense depth maps) to process a given frame and generate the densified depth map. This operation may be repeated iteratively for each frame in the captured video, to result in a dense depth map that covers the entire space captured in the video. The foregoing are intended to be examples only, and not a comprehensive list of possible approaches to creating the dense depth map. Other approaches that are now known or later developed may be applied for dense depth map creation, depending upon the specifics of a given implementation.

In operation 308, the dense depth map is used to build a volumetric representation of the space captured in the video. Operation 308 includes integrating the image from each frame with the dense depth map to build the volumetric representation. The resulting volumetric representation may be expressed with a volumetric truncated signed distance function (TSDF) volume. The TSDF volume is comprised of a plurality of cells, where each cell is given a value that indicates the signed distance to the closest real-world surface. Other techniques known in the art may be used to build the volumetric representation, and/or express the volumetric representation. Further, as with operation 306, operation 308 may be repeated iteratively for each frame to build a complete representation from the entire captured video. For example, the resulting cells of the TSDF volume can be iteratively updated by fusing each image and associated portion of the dense depth map for each successive frame, resulting in a 3D volume that represents the entire environment captured in the video.

In operation 310, the volumetric representation is used to generate a full 3D mesh. The full 3D mesh, in embodiments, is a collection of vertices and triangles that connect the vertices. Each vertex may have various types of data attached or otherwise associated with it. For example, in various embodiments the data may include the 3D position of the vertex (expressed with respect to a common origin point), a normal (a vector perpendicular to an underlying surface at the vertex), and color data (e.g. RGB color where the RGB system is used, or other color data, or greyscale or black and white data where color is not employed). Other embodiments may include more or less data at each vertex. The data may be stored and associated with each vertex in any appropriate fashion, such as a data structure that is part of each vertex, in a separate store along with a unique identifier that corresponds to a particular vertex, or another fashion suitable for a given implementation.

In one possible embodiment, a marching cubes algorithm can be used to extract triangular surfaces from the volumetric representation from operation 308. The algorithm divides the volumetric representation into a plurality of cubes, then identify cubes that intersect with an underlying surface, which may define one or more triangles. The surface may be identified from the TSDF function described above. Once the triangles are identified, associated vertices can be generated, resulting in the full 3D mesh. The marching cubes algorithm can be performed incrementally, e.g. on a frame by frame or other periodic basis as the video is progressively processed, to progressively develop the full 3D mesh, or may be performed once all frames in the captured video have been processed and fused to the 3D volume in operation 308, to result in the final 3D mesh. A progressive approach may be utilized where the mesh is constructed "on the fly", such as when a video stream is ongoing. Such an approach can potentially provide an interactive 3D mesh that is immediately useable, and expands as the video stream may pan to previously unviewed portions of the environment. Other algorithms known in the art may be employed, depending upon the specifics of a given implementation.

Depending upon the capabilities of an implementing system or device, method 300 may be performed progressively while the video is being captured, or may be performed on a complete captured video and associated AR data.

Figure 4:
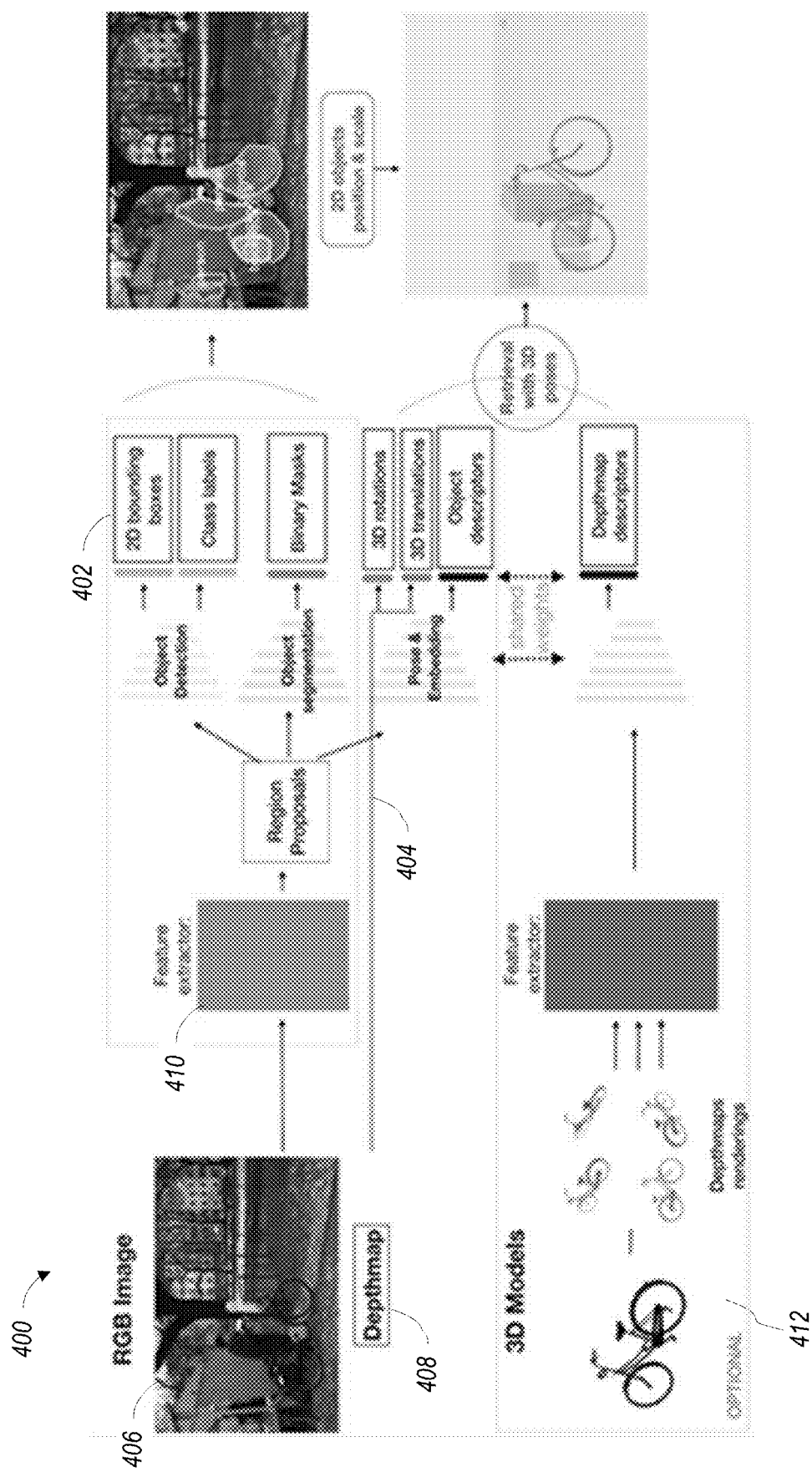
FIG. 4 is an example process flow for object detection and mapping to 3D object models of a captured video and associated 3D mesh from FIG. 2, according to various embodiments.

In addition to building a 3D mesh, the captured video and associated AR data (including data calculated in the various operations of method 300) are useful for performing object detection, which may be employed to extract various 3D objects from a captured video. Following object detection, a 3D scene graph may be constructed, which can be used for triggering content, such as AR content, at specific locations within the 3D mesh based upon the determined locations of the various 3D objects. FIG. 4 outlines an example flow 400 for detection and extraction of various 3D objects from the 3D mesh, dense depth map, and/or images from the various frames of the captured video, and construction of a 3D scene graph, according to various embodiments.

An image 406, such as may be obtained from a frame of the captured video, is passed through a feature extractor 410. In embodiments, each frame may be individually analyzed for features. In some embodiments, analysis across multiple frames may additionally/alternatively be performed to detect features from the captured video. Such analysis may be performed using known techniques for feature detection within a video stream. Object detection is then performed on the extracted features, to obtain object properties 402 such as 2D bounding boxes, class labels, binary masks such as segmentation masks, shape descriptors, and other data relating to detected objects. In some embodiments, a deep learning neural network may be used to perform this object detection, and this generates the bounding boxes, image segmentation, segmentation masks, etc. An existing technique such as Mask-RCNN may be used for the neural network object detection in embodiments, or another suitable technique currently known or later developed.

Following extraction of the objects as conveyed by object properties 402, in the depicted example, the detected objects may be intersected 404 with the dense depth map 408, to provide a 3D position, 3D rotation, and/or 3D shape for each detected object. In embodiments, the dense depth map 408 may have been generated as a result of operation 306 of method 300, discussed above. The 3D shape may be determined by referencing, or comparison of the object properties 402, such as shape descriptors, mentioned above, with a database 412 of known shapes and 3D models. This results in a graph of 3D objects that are detected within the captured video, which in turn can be used with the full 3D mesh, such as the 3D mesh resulting from operation 310 of method 300, to enable additional interactions with the 3D mesh beyond the interactions available with a 3D mesh that simply presents an undifferentiated solid model or volume.

Figure 5:
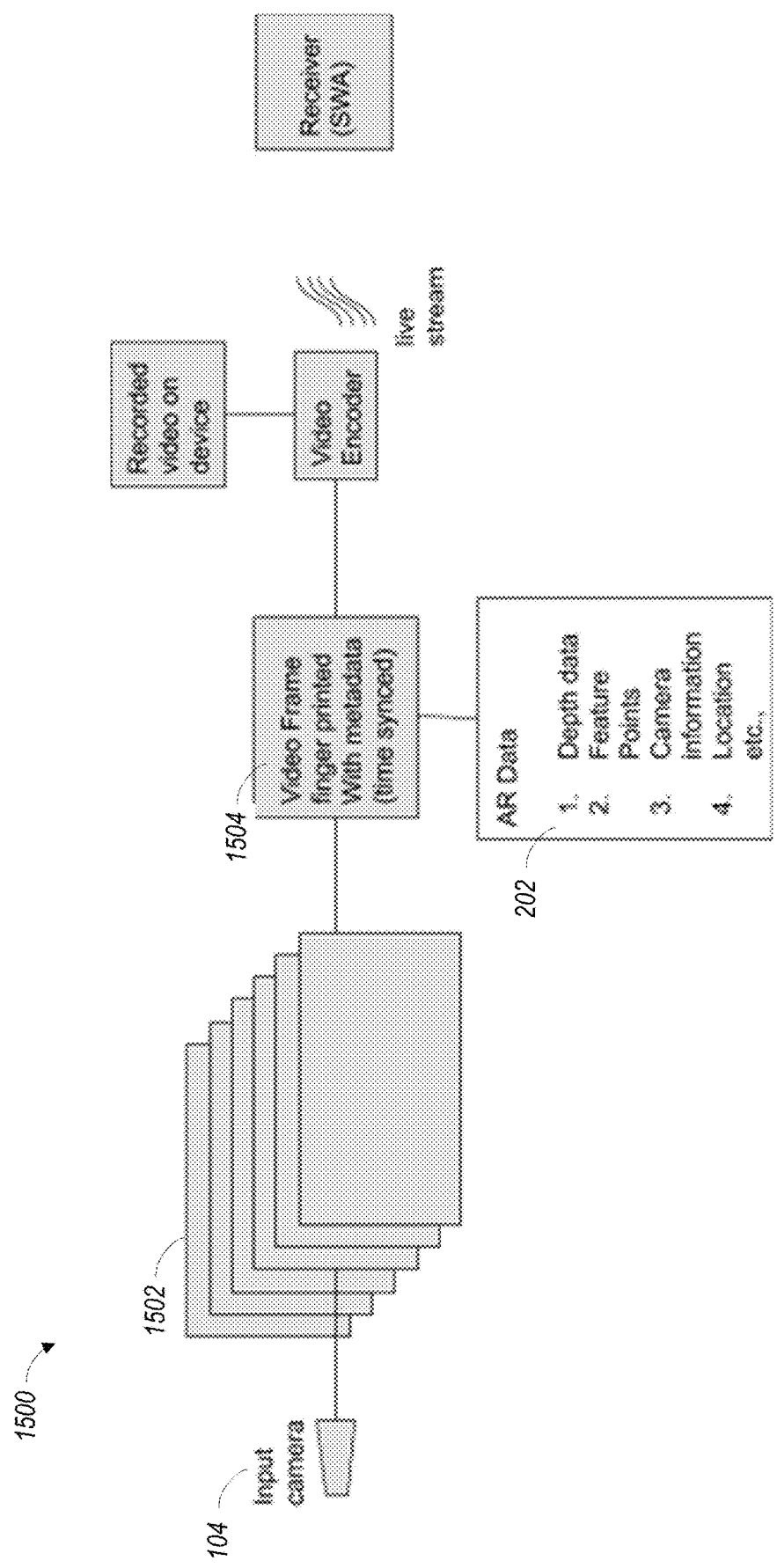
FIG. 5 depicts an example high-level flow for fingerprinting a captured video for synchronization with contemporaneously captured AR data, according to various embodiments.

As mentioned above, various steps of method 300 rely upon the AR data to be time synchronized with the associated frames in the captured video. In FIG. 5, an example flow 1500 for synchronizing frames 1502 of a video captured by a capture device and creation of an AR video is depicted. Frames 1502, in various embodiments, are the individual sequential frames of a video, such as video 201 that may be captured by a video camera 104. Following a fingerprinting process that will be described below, a fingerprinted frame 1504 results that is synced with a portion of AR data, such as AR data 202, that was captured substantially contemporaneously with the frame 1502. The end result is that each frame 1502 from the captured video becomes a fingerprinted frame 1504, thus providing a fingerprinted video that is synced with the AR data on a frame by frame basis. The collection of fingerprinted frames may be played back similar to the original captured video, but in synchronization with the AR data. AR data is described above with respect to FIG. 2. Playing back the fingerprinted video with AR data results in AR feature points being available that are synchronized with each video frame, similar to how originally generated by an AR API executed on the capturing device.

Figure 6:
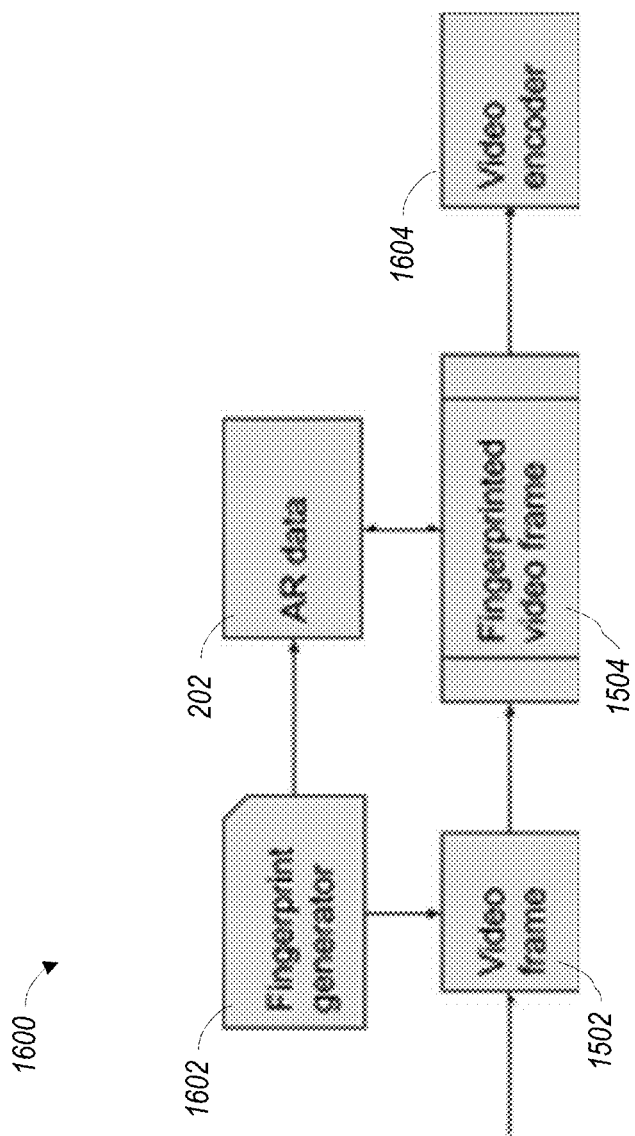
FIG. 6 depicts an example flow for fingerprinting the video frames that may be carried out in the high-level flow of FIG. 5, according to various embodiments.

Turning to FIG. 6, the fingerprinting process 1600 that results in each fingerprinted frame 1504 is depicted. A frame 1502 from the captured video, in embodiments, includes a timestamp or timecode, which can be used to synchronize the frame with data external to the frame, such as an audio track, or other data track. The timestamp of each frame may result in a running timecode when the video is played. The AR data, such as AR data 202, can comprise one or more data tracks that can be synced to the video. Process 1600 includes a fingerprint generator 1602, which creates a fingerprint data field that is unique for each frame and, by extension, for AR data associated with each frame. This fingerprint data field is then tagged to each frame 1502, resulting in fingerprinted video frame 1504, as well as the portion of AR data that corresponds to the frame 1502. The fingerprint in video frame 1504 may be visible or invisible to a viewer of the video frame, depending upon the method employed to tag the video frame. For example, the video frame fingerprint may be embedded within the image data of each frame in a location that is visible (e.g., traditional timecode), is out of frame (e.g. in image data that extends outside the visible area), is in metadata associated with each frame (such as a data structure for each frame that includes frame information separate from image data), or is embedded in another fashion so as to not be rendered visible, or via any other technique suitable for a given implementation. In still other implementations, embedding may be accomplished using a known digital watermarking technique, that allows a fingerprint or tag to be incorporated invisibly into a frame in a manner that is readily accessible by an appropriate algorithm. In some embodiments, such techniques may allow the fingerprint to be redundantly inserted into the frame, thus allowing the fingerprint to be retrieved even if some of the frame's image data or other associated data is corrupted. Thus, the AR data derived from a given frame can be recalled substantially contemporaneously when the frame is played back.

The fingerprinted video frames 1504 may be combined with the tagged AR data and supplied to a video encoder 1604. The video encoder 1604, in embodiments, takes each of the video frames 1504 and transcodes them into a selected video format, and further encodes the AR data into a data track that is integrated into the final video file produced by video encoder 1604. In other embodiments, the AR data may instead be placed into a separate file or database that is distinct from the video file, but can be recalled and synced during playback by use of the fingerprints. The use of a fingerprint, in addition to allowing synchronization of video frames with AR data, further offers a robustness that allows AR data to remain synchronized even if one or more frames of video are dropped or lost. Where a gap in frames is detected, the unique fingerprints can allow the AR data to readily be resynchronized with the frames. Further, depending upon the nature of the fingerprints, the fingerprint may allow detection of dropped frames, such as where the fingerprint changes incrementally or in a regular pattern between adjacent frames. Duplication of the fingerprint between a frame's image data and AR data may allow detection of dropped frames and/or data where the fingerprint data is missing from either the image data or AR data, but not both. Still further, deviation of the fingerprint from the expected pattern may allow for quick location of the correct AR data to retrieve by indicating how many frames were dropped or otherwise lost.

Although this disclosure has discussed generation of 3D meshes from video captures, it should be understood that still images may also be used in conjunction with video frames with the techniques disclosed herein. A still image may be correlated with one or more video frames and used to generate additional depth points, as discussed above. Further, a single still frame may be used by itself where depth points for the point cloud and AR data are available from other sensors; in such an example, the single still frame may essentially act as a texture map.

Finally, it should be recognized that point clouds from multiple subsequent captures, when correlated with the point cloud of an initial capture, may be merged into the initial capture point cloud, and that these subsequent captures may be from a variety of sources, e.g. crowdsourcing. For example, applying the techniques disclosed herein from crowd-sourced images for popular public locations can result in a dense and highly accurate point cloud for a potentially large and panoramic area. Such a point cloud in conjunction with multiple captured images may enable highly accurate placement of AR objects. Further, the point clouds from the subsequent capture(s) can be used, in conjunction with the initial capture point cloud, to regenerate an expanded and/or enhanced 3D mesh beyond the initial 3D mesh generated from the initial capture point cloud.

In some examples, objects appearing in a source capture may have been removed, moved, or altered, and/or new objects introduced, in the subsequent capture as compared to the original capture. In such scenarios, one or more different 3D meshes may be generated from the combined point clouds by selecting which capture should take priority for determining object presence. For example, a user could select to generate a 3D mesh with the initial capture having priority. In such a selection, objects appearing in the original capture that were removed or moved in subsequent captures would be rendered according to the original capture, but still utilizing data from subsequent captures that expand beyond the original capture and/or augmented objects that are unchanged between captures. In another example, a user could select to generate a 3D mesh with one of the subsequent captures having priority. The result would be a 3D mesh having objects appearing or located in the selected subsequent capture having priority over other earlier (or later) captures.

Figure 7:
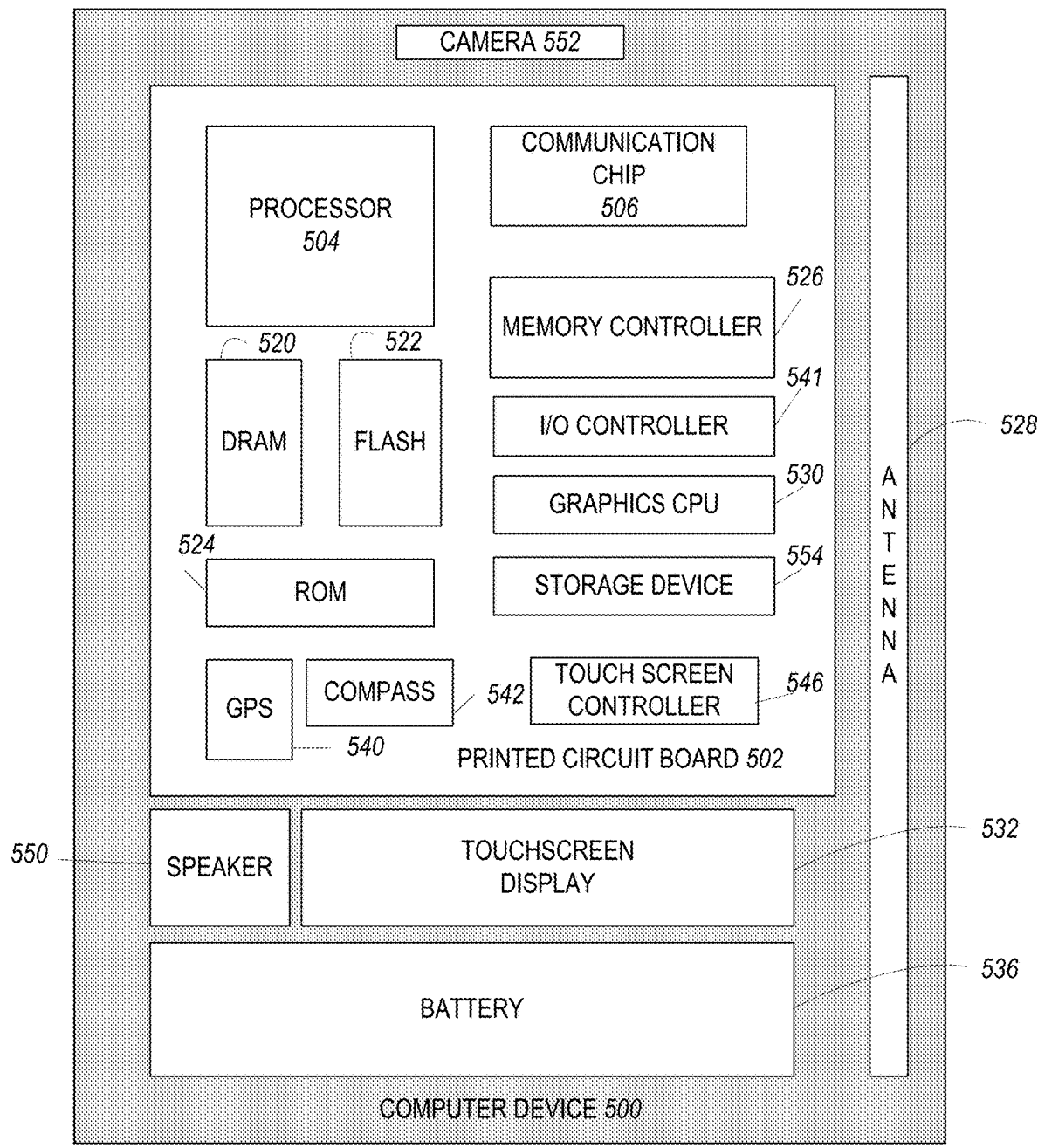
FIG. 7 is a block diagram of an example computer that can be used to implement some or all of the components of the system of FIG. 1, according to various embodiments.

FIG. 7 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100, process flow 200, method 300, process flow 400, process flow 1500, and/or process flow 1600, described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 8:
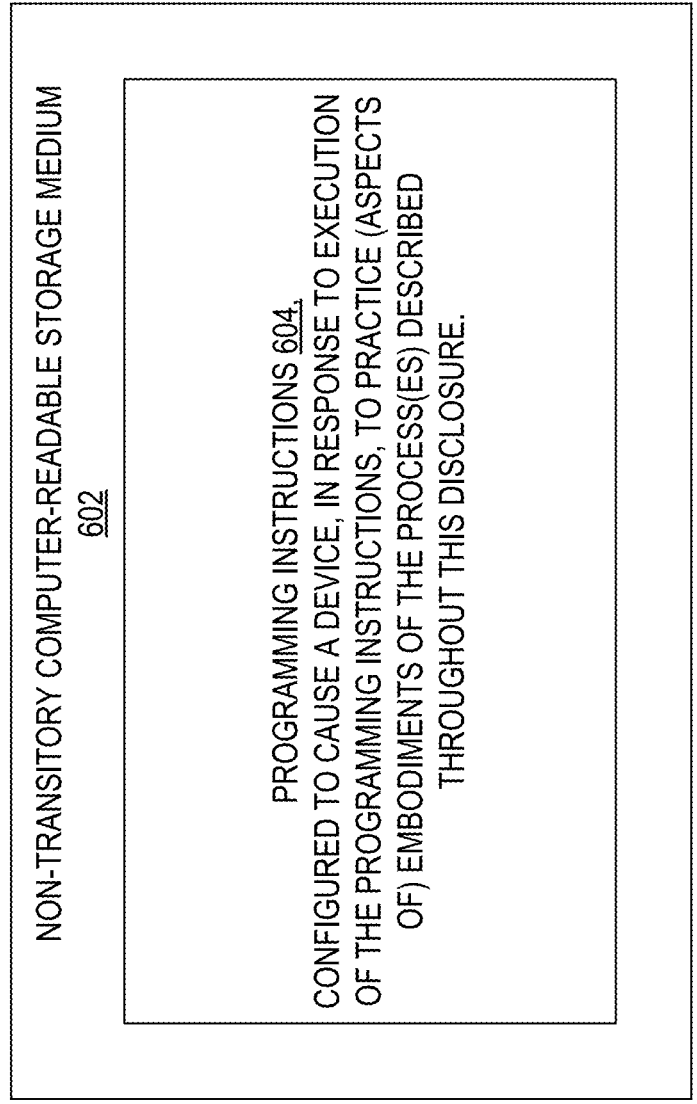
FIG. 8 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, process flow 200, method 300, process flow 400, process flow 1500, and/or process flow 1600. In alternate embodiments, programming instructions 604 may be disposed on multiple computer-readable non-transitory storage media 602 instead. Instill other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for generation of a 3D mesh from a video stream, comprising:
   capturing a video stream and AR data synchronized to the video stream, wherein the video stream is comprised of a plurality of frames, each frame including image data;
   generating, with the video stream and AR data, a depth map for each frame of the plurality of frames of the video stream;
   incrementally generating, from the depth map and image data for each frame of the plurality of frames, a 3D volume representing an environment captured by the video stream;
   generating, from the 3D volume, the 3D mesh;
   detecting at least one object from the plurality of frames; and
   generating, with at least one object, a 3D scene graph.

2. The method of claim 1, wherein capturing the video stream and AR data synchronized to the video stream further comprises:
   generating, for each frame of the plurality of frames, a fingerprint that is unique to each frame;
   associating each fingerprint with its corresponding frame; and
   associating each fingerprint with AR data, from the captured AR data, that corresponds to the corresponding frame.

3. The method of claim 1, further comprising:
   correlating each of the detected objects with the 3D mesh to obtain a predicted 3D position and 3D rotation of each object.

4. The method of claim 3, further comprising obtaining the predicted 3D position and 3D rotation of each object using a neural network.

5. The method of claim 3, further comprising referencing the one or more objects with a database of 3D models.

6. The method of claim 1, wherein capturing the video stream and AR data comprises capturing the video stream with a video camera, and capturing at least some of the AR data with one or more spatial position sensors.

7. The method of claim 1, further comprising calculating at least some of the AR data from the plurality of frames.

8. A non-transitory computer readable medium (CRM) comprising instructions that, when executed by an apparatus, cause the apparatus to:
   capture a single video stream comprised of a plurality of frames, each frame including image data;
   capture AR data corresponding to each frame of the plurality of frames;
   generate, from the AR data, a depth map for each frame of the plurality of frames;
   construct, from the depth map of each frame, a 3D volume;
   generate, from the 3D volume, a 3D mesh;
   detect one or more objects from the plurality of frames; and
   generate, with the at least one object, a 3D scene graph.

9. The CRM of claim 8, wherein the instructions are to further cause the apparatus to:
   generate for each frame of the plurality of frames, a fingerprint that is unique to each frame;
   tag each fingerprint to its frame; and
   associate each frame's corresponding AR data to its fingerprint.

10. The CRM of claim 8, wherein the instructions are to further cause the apparatus to
    correlate each of the detected objects with the 3D mesh to obtain a predicted 3D position and 3D rotation of each object.

11. The CRM of claim 8, wherein the instructions are to further cause the apparatus to reference the one or more detected objects with a database of 3D models.

12. The CRM of claim 8, wherein the instructions are to further cause the apparatus to employ a neural net to generate the depth map for each frame of the plurality of frames.

13. The CRM of claim 8, wherein the instructions are to further cause the apparatus to capture the video stream from a video camera, and capture the AR data at least in part with one or more spatial position sensors.

14. The CRM of claim 13, wherein the instructions are to further cause the apparatus to capture the AR data corresponding to each frame of the plurality of frames at least in part from analysis of each corresponding frame.

15. The CRM of claim 8, wherein the apparatus is a mobile device.

16. A non-transitory computer readable medium (CRM) comprising instructions that, when executed by an apparatus, cause the apparatus to:
    receive a video stream comprised of a plurality of frames, each frame including image data;
    receive AR data corresponding to each frame of the plurality of frames;
    generate, from the AR data, a depth map for each frame of the plurality of frames;
    construct, from the depth map of each frame, a 3D volume;
    generate, from the 3D volume, a 3D mesh;
    detect one or more objects from the video stream;
    correlate each of the detected objects with the 3D mesh to obtain a predicted 3D position and 3D rotation of each object; and
    generate, with the detected objects, a 3D scene graph.

17. The CRM of claim 16, wherein the instructions are to further cause the apparatus to reference the one or more objects with a database of 3D models.

18. The CRM of claim 16, wherein the apparatus is a server.

19. The CRM of 18, wherein the instructions are to further cause the apparatus to receive the video stream and AR data over a network.

\* \* \* \* \*